United States Patent Office 3,314,642
Patented Apr. 18, 1967

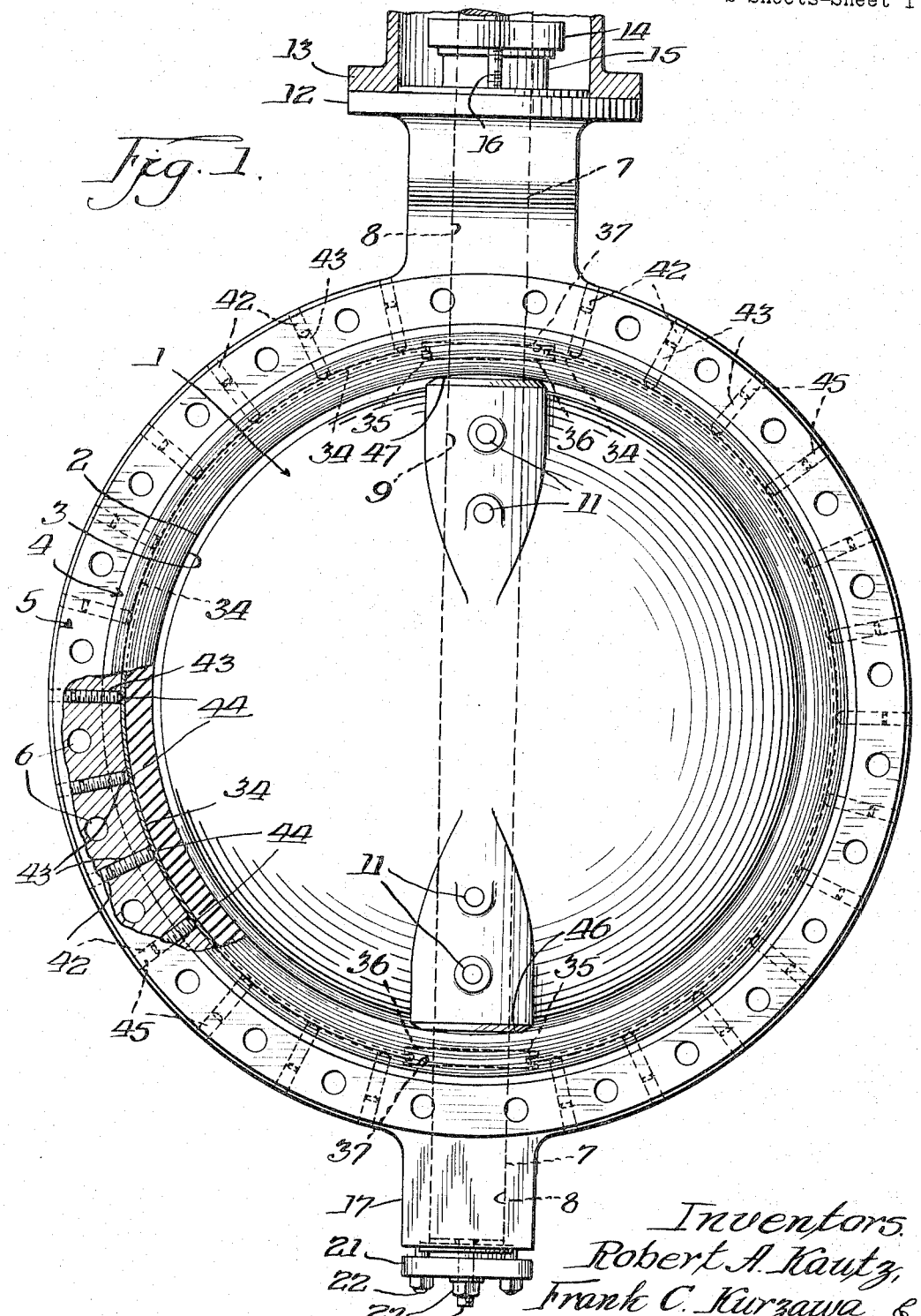

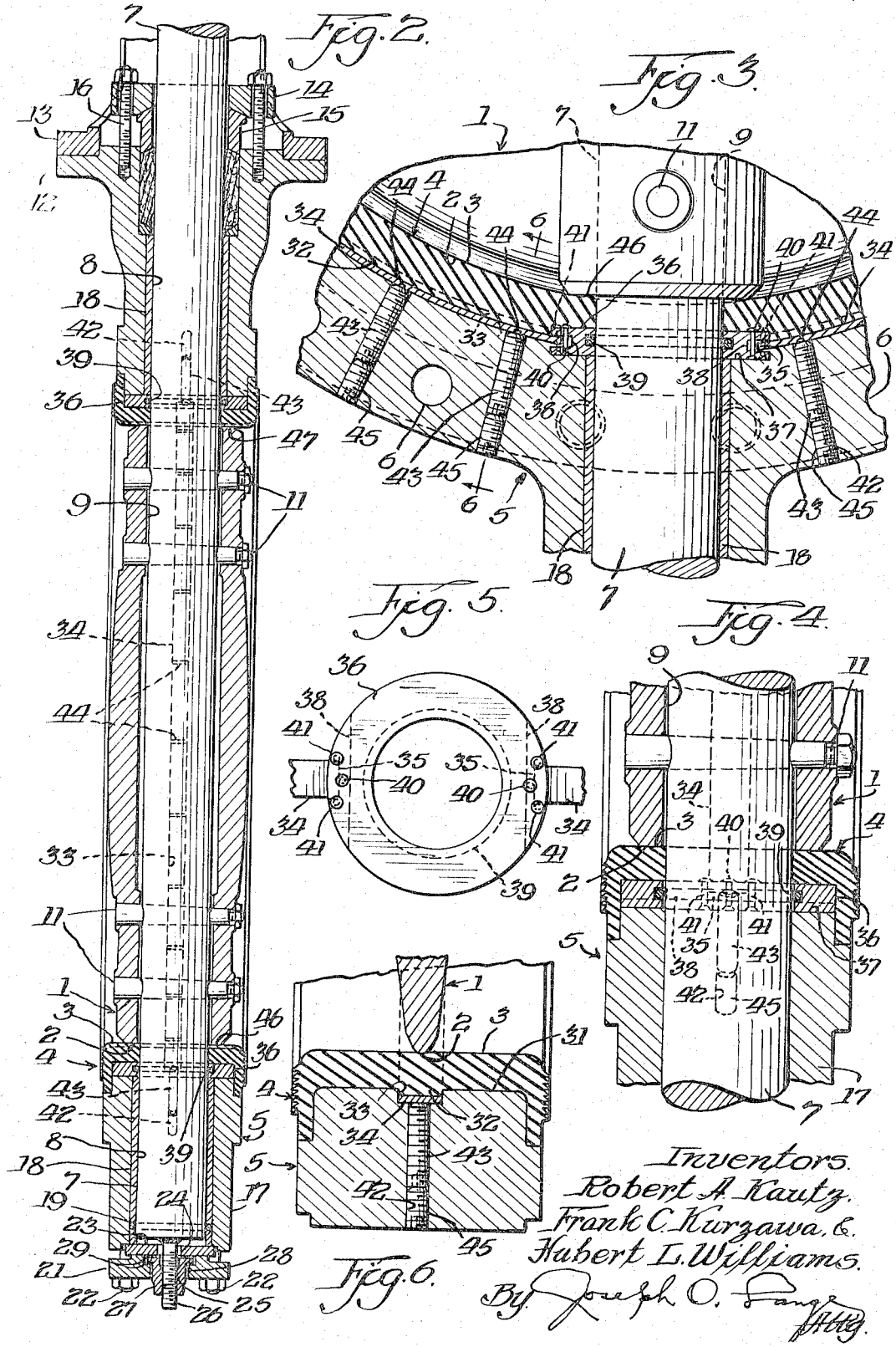

3,314,642
BUTTERFLY VALVE WITH ADJUSTABLE
SEATING MEANS
Robert A. Kautz and Frank C. Kurzawa, Chicago, and
Hubert L. Williams, Hinsdale, Ill., assignors to Crane
Co., Chicago, Ill., a corporation of Illinois
Filed Mar. 9, 1964, Ser. No. 350,255
10 Claims. (Cl. 251—307)

The invention relates generally to a butterfly valve, and, more particularly, it is concerned with a novel adjustable seat and stem sealing means therefor.

At the outset, in order to have a better appreciation of the background of this invention, it should be understood that there has long existed the problem of providing suitable seat mountings for butterfly valves in the larger sizes, particularly those of the order of 30″ and larger, including inner portions around the valve shaft or stem.

In valves of this type in such size ranges, it is an important consideration if valve tightness is to be maintained that the valve seat be effectively and conveniently adjustable to provide fluid sealing relationship with the periphery of the valve closure member. It should be understood that the problem is a particularly critical one, since the closure members in valves of this type must not only be properly guided, but also provision must be made to handle the extremely large mass from both weight and pressure standpoints during the course of operation. The closure member or disc may weigh several hundred pounds depending upon the size of the valve, therefore making it necessary that such closure member be adequately supported and adjustable to provide for wear as it takes place during the course of service. It should also be appreciated that such adjustment is not only critical, but must be conveniently accessible and for maximum effectiveness it must also provide for such adjustment at relatively small increments around the periphery of the closure member and the valve seat. It will be understood that the seat is preferably an elastomer material and comparatively resilient and soft. It must therefore be adjustable over a large periphery of both seat and disc if valve tightness is to be maintained.

With this background in mind, this invention has a number of objects which it has accomplished.

By a convenient construction and method as hereinafter disclosed in detail, a fluid tight joint is easily maintained between the periphery of the valve and its seat when the valve is in the closed position, and at the valve shaft or stem at all times.

Another object of the invention is to provide for an adjustable seal readily accessible between the cooperating surfaces of the valve closure member and the valve seat whereby the latter member is capable of exterior adjustment.

Another object is to provide for a valve seat construction for a butterfly valve or the like in which an adjustable seat ring having a plurality of preferably metal segments, either joined or separated as hereinafter described. The purpose of the latter construction is to provide means for selectively moving certain peripheral areas of the valve seat in a radial direction toward the periphery of the closure member to provide a fluid sealing joint between the valve closure member and the seat.

Another object is to provide for a novel valve seat construction specially suitable for butterfly valves, in which the valve seat in combination with adjustable means is not only firmly mounted within the valve casing or body but is also suitably guided so as to be maintained accurately in a desired central position with relation to the pivotally mounted valve closure member.

Another object is to provide for a means by which the adjustment is effected employing a suitably segmented band or liner, preferably of semi-circular configuration, in which, as desired, all or some of the segments thereof may be joined or separated depending upon the type and size of valve required.

Another object is to provide for an adjustable valve seat for butterfly valves in which said band or liner has contact directly with the adjustment mechanism and may be accurately and conveniently molded and bonded to the valve seat during the course of the manufacture of the said seat.

Another important object is to provide singly or in combination therewith for an adjustment mechanism cooperating with the liner or band in which the supporting stem at its inner portions relative to the valve casing or body may be suitably adjusted to provide the desired compression of a portion of the elastomer seat in the immediate area adjoining said stem to effect the fluid seal between the closure member and the inner portions of said stem.

Another important object is to provide in combination with said seat and closure member convenient means on the casing and accessible from the exterior thereof for adjusting the axial position of the closure member relative to the valve seat, the latter adjustment means being provided with a bearing assuming a substantial portion of the load imposed upon it by the closure member.

Other objects and advantages will become more readily apparent upon proceeding with the following description read in light of the accompanying drawings, in which:

FIG. 1 is an end view of an assembly of a butterfly valve embodying the valve seat and stem-trunnion seal of this invention;

FIG. 2 is a transverse sectional view taken at the centerline of the construction shown in FIG. 1;

FIG. 3 is a magnified fragmentary sectional assembly view of the construction shown in FIG. 1 taken at the lower peripheral portion of the seat thereof;

FIG. 4 is a magnified fragmentary sectional view taken at the lower portion of the seat construction shown in FIG. 2;

FIG. 5 is a plan view of the novel plate or collar arranged for cooperation with the segmented bands or liners applied at the trunnion portions of the valve; and FIG. 6 is a fragmentary sectional view taken on the line 6—6 of FIG. 3.

Similar reference numerals refer to similar parts throughout the several views.

Referring now to FIG. 1, an end view of what is known as a wafer type of butterfly valve is shown in which the valve closure member generally designated 1 is shown in the closed position and has the peripheral portion 2 thereof in contact with the surface 3 of the valve seat generally designated 4 of this invention mounted upon the valve casing or body generally designated 5. It will be appreciated that the valve body 5 is provided with the usual annularly arranged plurality of holes 6 for attachment between flanges (not shown) when effecting the connection to a pipeline. It will be appreciated that the closure member 1 is pivotally movable with respect to the body 5 and to the valve seat 4. In furtherance of such pivotal movement, a valve stem or shaft 7 is received within the bored portion 8 of the body 5 and the continuation of the latter bore 9 within the closure member 1.

In order to maintain the stem 7 in non-rotatable position relative to the closure member 1, the pins 11 in superposed relation are assembled in a relatively close fit to extend transversely through the said stem and closure member as indicated and for the purpose stated. At the upper end portion of the valve body a suitable connecting flange 12 engaging an actuating support mechanism such as the valve yoke 13 provides for the positioning of the actuating means for rotating the stem 7 within an arc of approximately ninety degrees by means not shown such as a lever or the like. A conventional stuffing box at 14 cooperates with a gland 15 and bolts 16 for providing a leakproof seal around the stem 7.

At the lower end of the valve body 5, a hollow casing extension 17 journals the stem 7 and as more clearly shown in FIG. 2 is preferably provided within its hollow portion with the liner 18. A suitable O-ring 19 seals the lower end of said liner and a cover 21 is bolted as at 22 to the lower end of the extension 17 as shown. An interposed plate 23 having an aperture as at 24 receives the adjusting screw 25 integral with said stem and a lock screw 26 threadedly journalled within the adjusting bushing 27 projecting within the apertures 28 of the cap 21. The purpose of the mechanism hereinabove immediately described is to serve as a transverse adjustment for the stem and closure member relative to the valve seat 4 during the course of final assembly. Interposed thrust washers 29 are employed as indicated.

The description herein described thus far is applicable to a conventional valve.

The description immediately following is concerned with this invention in which a novel adjustable valve seat cooperates with the closure member and the casing to provide the means by which an unusually large size butterfly valve can be adjusted and maintained in fluid tight operable condition.

Specifically, the valve seat ring 4 is made in a substantially inverted U-configuration when viewed in cross-section, as shown more clearly in FIG. 6, and is molded over and within the valve casing annular surface 31. The latter surface is interrupted to provide for a central annular portion 32 which is received snugly within the annular groove 33 of the casing 5. A segmented band or liner 34 is received within the groove 33 and is preferably molded to the central annular portion 32 of the seat 4 for reasons hereinafter made clear.

As shown more clearly in FIG. 1, the segmented band or liner 34 is preferably of substantially semi-circular configuration. As shown in FIG. 3, its inner end limits as at 35 are defined in spaced-apart relation by the plate or collar 36 at both the upper and lower bearings for the stem 7. The said liner portions 34 are preferably received within recessed portions of the body as at 37. The median annular portion of the collar 36 comprises milled chordal slots as at 38 as shown more clearly in the enlarged view of the said collar in FIG. 5. The purpose of said milled recesses oppositely disposed at 38 is to provide for the reception of the inner end portions 35 of the segmented band 34 and at the same time permitting a clearance between the end portions of the band and the milled slot portions 38.

Preferably, but not necessarily, an O-ring 39 is applied to effect a fluid seal for the stem 7 between the latter member and the collar 36.

For purpose of guiding the inner end limits of the segmented semi-circular bands 34, the oppositely disposed through-pins 40 and 41 are mounted on said collar, as shown, to guide and restrain movement of the ends 35 of the segmented bands 34 in transverse directions relative to the milled recess 38 of the collar 36.

In collaboration with the segmented liners 34 and at suitable intervals around its periphery in the same plane defined by said segmental liners, as shown more clearly in FIG. 1, the casing 5 is suitably tapped at 42 to receive the radially extending threaded adjusting screws 43. The latter members are provided, as indicated, in the usual manner with Allenhead sockets for suitable rotation of said adjusting screws 43 to cause the latter members to bear directly against the segmented liners at said suitable intervals or spaces on peripheral portions of the latter liner members. Such inward radial movement of the adjusting screws 43 will effect the displacement of the liner segments in the liner area controlled by each adjusting screw 43.

In order to impart desired flexibility to the segmented bands in response to the adjustment obtained by the axial movement of the screws 43, it has been found desirable in some cases to provide slots which are relatively narrow and shallow saw cuts 44 in the outer periphery of the segmented liner 34 positioned transversely across the liner and equally spaced from each other, as clearly shown in FIG. 3. The said cuts are preferably located immediately adjacent the inner ends of the adjusting screws 43 to impart greater flexibility to the liner as the said adjustment by the screws 43 takes place.

Or as an alternate in other cases the slots 44 may be located between the adjusting screws 43 when deemed desirable and depending upon service conditions and valve size.

It should be clear that when the segmented liner adjustment is completed by means of the screws 43, suitable locking screws as indicated at 45 are inserted to avoid tampering or accidental displacement of the adjusting screws 43 and further to prevent the accummulation of foreign matter which might otherwise interfere with the adjustment of the screws 43.

Referring now to FIG. 5, it will of course be appreciated that as the adjustment by means of the selectively spaced apart adjusting screws 43 is accomplished, the over-all effect is to reduce the diameter of the segmented ring and thereby to cause the inner end limits of the liners 34 to be moved as previously stated in a direction towards the transverse surfaces defining the inner limits of the milled chordal recesses 38. As previously stated, the through-pins 40 and 41 will thus function to guide the liner end portions 35 towards the transverse surfaces of recesses 38. It will also be understood that as the adjustment of the screws 43 is made in a direction towards compressing the seat 4 in around the periphery 2 of the closure member 1, the end portions 35 of the segmented liner will tend to move the collar 36 in a direction toward the closure member and thus cause the seat portion around the stem in planes above and below as indicated at 46 and 47 to be compressed, as more clearly shown in FIG. 1. Thus, the adjoining adjusting screws 43 in their cooperation with the upper and lower collars 36 around the stem will apply desirable compression of the seat at 46 and 47 thereby to complete the fluid sealing tightness not only around the periphery 2 of the of the closure member 1, but also around the stem bearing portions for the closure member as above indicated.

It should be appreciated that the pin 40 in its more important aspect functions during the molding operation to position the segmented liner portions 34 in the mold prior to the molding of the seat 4 to which the said liner portions are bonded. However, it has been found that under certain circumstances, the said pin may be dispensed with after the molding operation by providing that said pin 40 is constituted of a frangible design or a readily yieldable material. Therefore, as the liner segments at their inner end portions 35 are moved slightly inwardly in the course of actuation by the adjusting screws 43, the said liner end portions may abut against said pin with a shearing force thereby to cause the said pin to be deformed or severed. Clearly, this will allow the end portions of the liner to have an increased degree of movement inwardly in contrast to that restriction initially imposed by the original positioning of said pin 40 during the molding operation.

It should now be apparent that a more efficient performing butterfly valve has been obtained resulting in ease and convenience of tightness with a minimum operating torque required on the valve shaft or stem.

In the course of the above description, in referring to the transverse saw cuts 44 on the segmented liners 34 for purpose of imparting greater flexibility to said liner sections, it should be understood that under certain conditions it may be desirable that all or a certain predetermined number of such saw cuts extend transversely through the liner or band and thereby create additional separate segments. The obvious benefit resulting is that such separate segments may be moved independently and transversely in a radial direction towards the valve seat 4 as desired without moving the adjoining or adjacent segments actuated by the remaining adjusting screws 43. This structural arrangement provides an unusually high degree of adjustability of the seat previously unknown.

The segmented liner or band 34 is preferably bonded to the outer peripheral portion of the seat 4 during the molding operation as shown more clearly in the fragmentary sectional view of FIG. 6.

While only a single embodiment has been shown and described, it will be appreciated that the invention has broad application to a large variety of devices in which fluid sealing tightness must be obtained around the periphery of a movable closure member or plunger and shaft and in which fluid tightness is an important consideration. The scope of the invention should therefore be interpreted in light of the appended claims.

We claim:

1. A flexible resilient seat ring with segmented liners therewithin for engagement peripherally with a closure member, a casing for carrying said seat ring and said closure member, shaft means for actuating said closure member, spaced apart collars on said shaft means above and below said closure member cooperating with segmented liners, means provided by said casing for moving arcuate portions of said seat ring selectively inwardly radially to effect a peripheral fluid sealing contact with said closure member, said collars being movable by said liners to effect fluid sealing around said shaft means adjacent said collars upon actuation of said casing movable means.

2. A butterfly valve structure comprising a valve casing, a valve closure member rotatably mounted therein to close the passage through the casing, a resilient seat ring constituting the engaging face for said closure member when said closure member is in closed position and against which a cooperating face of the said seat ring is adapted to contact in edge to edge relation, shaft means journalled in the casing for rotating said closure member, means on said casing for moving said cooperating surface of said seat ring inwardly at a predetermined location adjacent said shaft journalling means in the casing, said means including arcuate segments cooperating with said shaft journalling means to effect a fluid seal between said shaft journalling means and portions of said resilient seat ring immediately adjacent said shaft journalling means upon actuation of said casing movable means.

3. The subject matter of claim 2, the said shaft journalling means comprising spaced apart collars cooperating with said arcuate segments to effect said fluid seal.

4. The subject matter of claim 3, the said collars having side disposed opposite slots for receiving at least one end portion of said arcuate segments.

5. The subject matter of claim 3, pins mounted on said collars for receiving and guiding said arcuate segments.

6. The subject matter of claim 5, said seat ring being a molded product, one of said pins being inwardly disposed relative to said other pins to limit the inward movement initially of said arcuate segments relative to said collars during the molding of said seat ring.

7. The subject matter of claim 5, at least one of said pins being frangible.

8. A butterfly valve structure comprising a valve casing, a valve closure member rotatably mounted therein to close the passage through the casing, a resilient seat ring constituting the engaging face for said closure member when said closure member is in closed position and against which a cooperating face of the said seat ring is adapted to contact in edge to edge relation, means radially adjustable with respect to said casing for moving said cooperating surface of said seat ring inwardly to permit the closing of the butterfly valve, said means including a segmented liner or band cooperating with said moving means to permit selective movement of said latter means inwardly, said liner containing a plurality of slots in the outer periphery of said liner, said slots positioned transversely across the liner at substantially equidistant intervals around the outer periphery thereof.

9. The subject matter of claim 8, at least certain of said slots extending through the segmented liner or band.

10. The subject matter of claim 8 wherein said means for moving said cooperating surface of said seat ring includes a plurality of adjusting screws threadedly engaged in said casing, said screws contacting said liner or band at spaced intervals around the periphery of said casing and adapted to positively and selectively position said seat ring with respect to said closure member.

References Cited by the Examiner
UNITED STATES PATENTS

| | | | |
|---|---|---|---|
| 521,575 | 6/1894 | Spencer | 277—148 X |
| 1,990,309 | 2/1935 | Phillips | 251—173 X |
| 3,048,363 | 8/1962 | Garrigan | 251—307 |
| 3,144,040 | 8/1964 | White | 251—307 X |
| 3,197,174 | 7/1965 | Killian | 251—307 |

M. CARY NELSON, *Primary Examiner.*

R. C. MILLER, *Assistant Examiner.*